July 1, 1958 C. B. SHEPPARD ET AL 2,841,411
PRE-SELECTOR FOR POSITIONING RUNNING GEAR
RELATIVE TO TRAILER BODY LOAD
Filed Jan. 10, 1956 5 Sheets-Sheet 1

INVENTORS
CHARLES BRADFORD SHEPPARD
PAUL TENENBAUM
BY
Caesar and Rivise
ATTORNEYS.

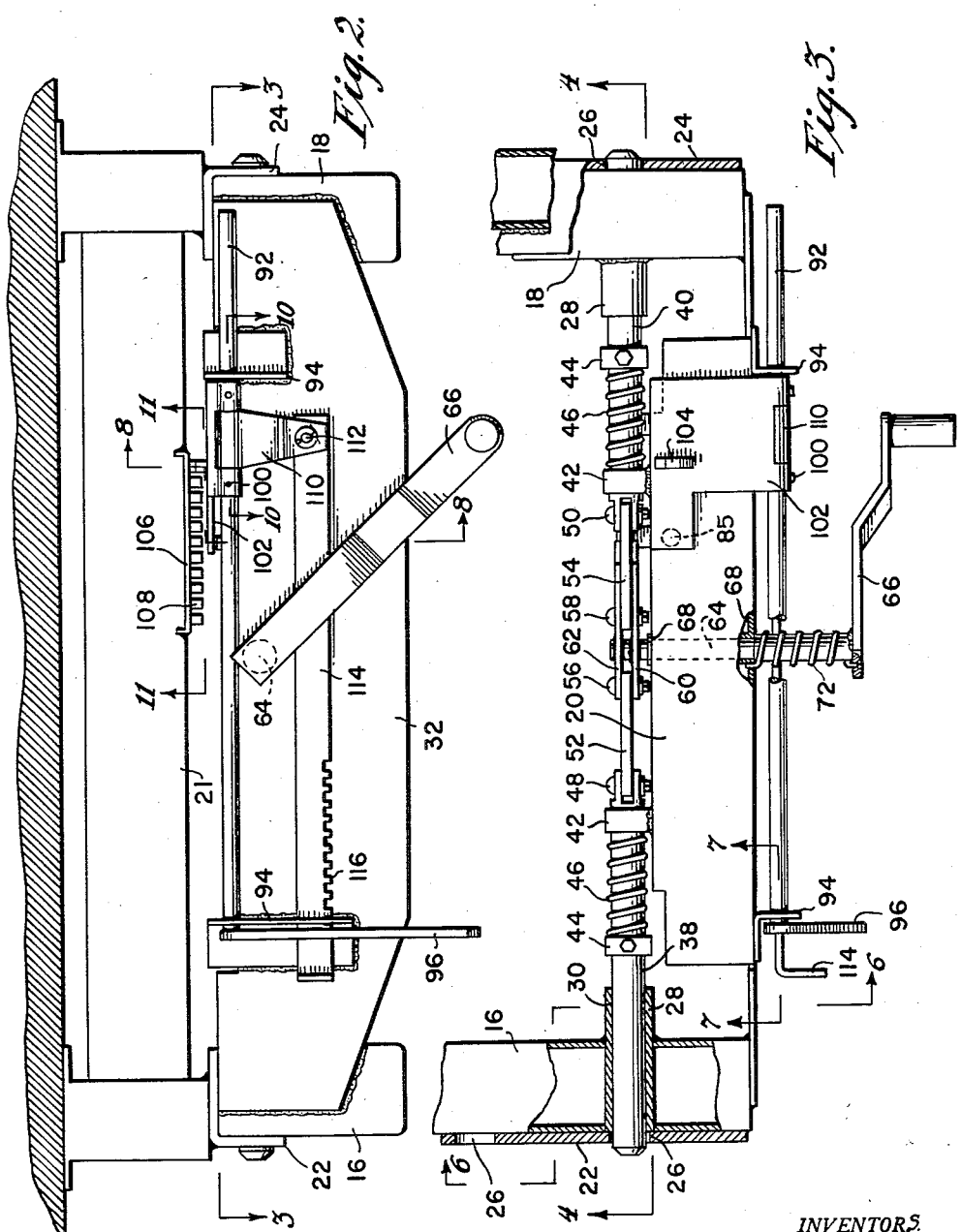

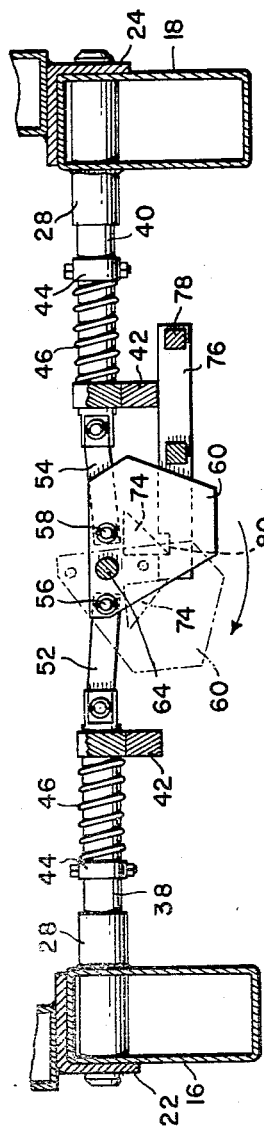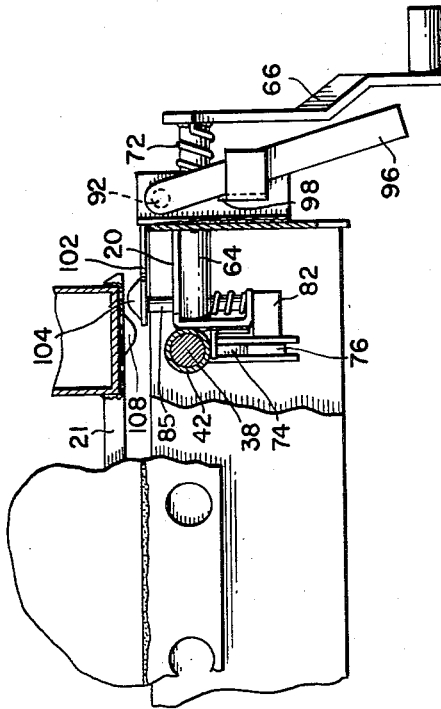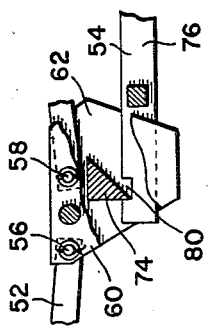

July 1, 1958  C. B. SHEPPARD ET AL  2,841,411
PRE-SELECTOR FOR POSITIONING RUNNING GEAR
RELATIVE TO TRAILER BODY LOAD
Filed Jan. 10, 1956  5 Sheets-Sheet 4
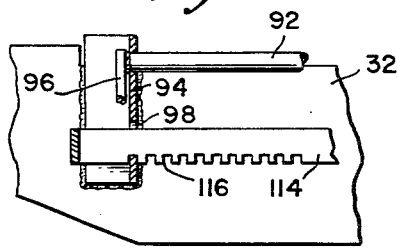
Fig. 7.
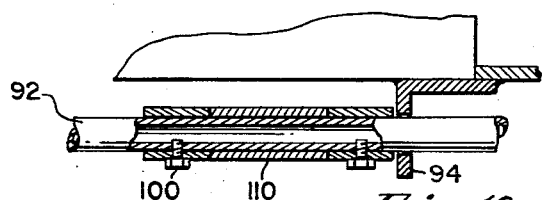
Fig. 10.
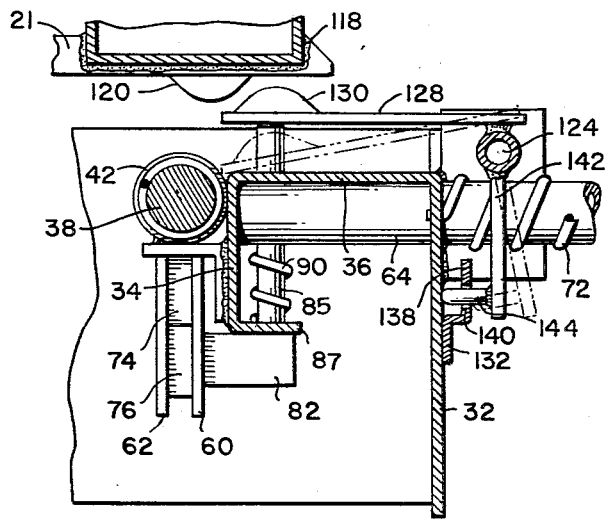
Fig. 14.
Fig. 11.
INVENTORS.
CHARLES BRADFORD SHEPPARD
PAUL TENENBAUM
BY
Caesar and Rivise
ATTORNEYS July 1, 1958
C. B. SHEPPARD ET AL
2,841,411
PRE-SELECTOR FOR POSITIONING RUNNING GEAR
RELATIVE TO TRAILER BODY LOAD
Filed Jan. 10, 1956
5 Sheets-Sheet 5
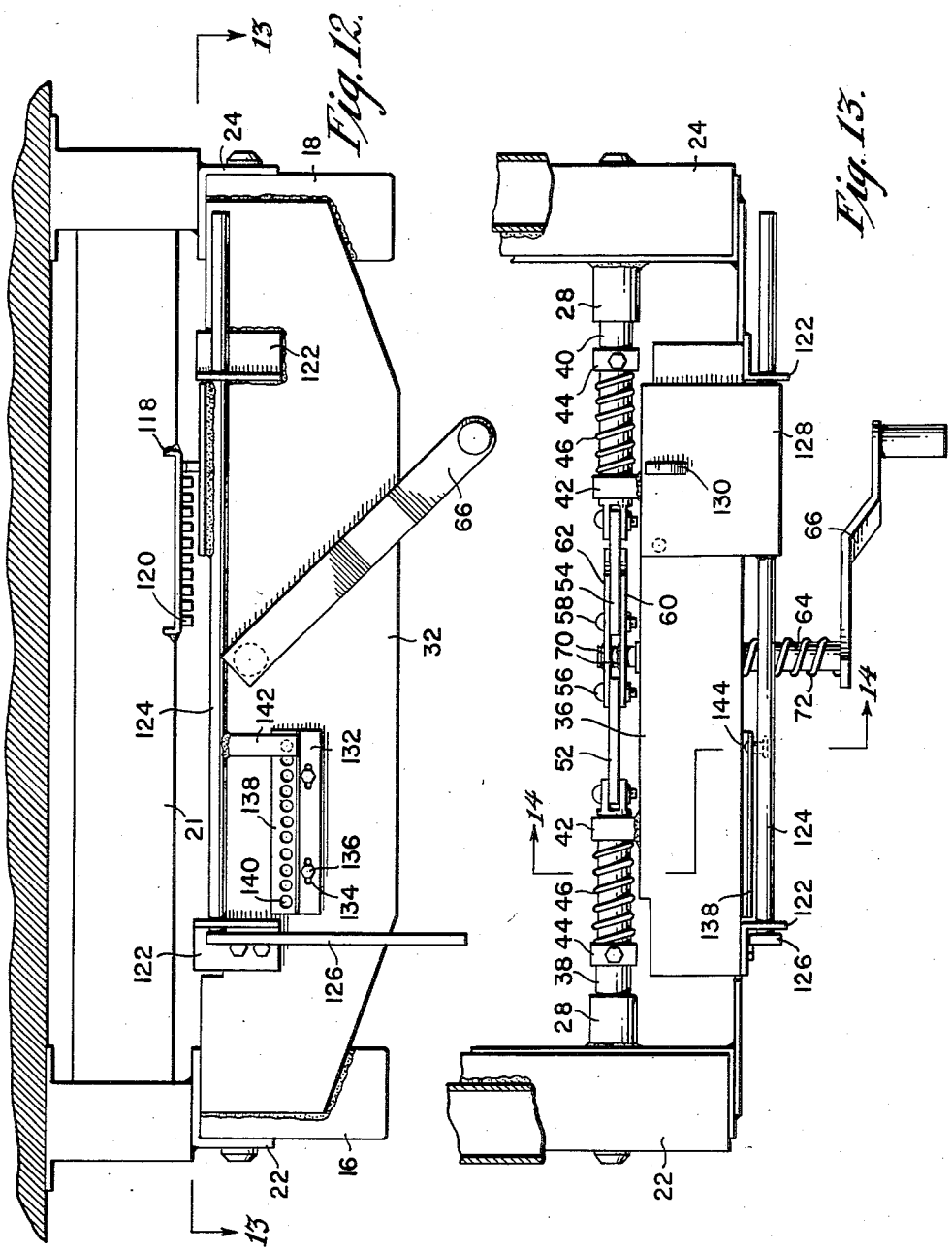
INVENTORS.
CHARLES BRADFORD SHEPPARD
PAUL TENENBAUM
BY
Caesar and Rivise
ATTORNEYS.

United States Patent Office 2,841,411
Patented July 1, 1958

2,841,411

PRE-SELECTOR FOR POSITIONING RUNNING GEAR RELATIVE TO TRAILER BODY LOAD

Charles Bradford Sheppard, Meadow Brook, and Paul Tenenbaum, Philadelphia, Pa., assignors, by mesne assignments, to Fruehauf Trailer Company, Detroit, Mich., a corporation of Michigan Application January 10, 1956, Serial No. 558,278

5 Claims. (Cl. 280—81)

This is a continuation-in-part of our copending application Serial No. 507,342 filed May 10, 1955. The invention herein described appertains to a motor vehicle having a means for pre-selecting and adjustably positioning the body load relative to the running gear.

The primary object of the present invention is to provide a pre-selector which improves the ease of operation of the device described in our above-mentioned application but which maintains the same basic principles of structure and function.

Like the previous device, the present one includes spring-urged rods coupling the running gear of a vehicle to its body, means to retract the rods so that the running gear is free to move relative to the body, means to release said retracting means, and means automatically to actuate said releasing means upon predetermined movement of the running gear and allow the coupling rods to re-engage the body at a pre-selected position.

In the present device, however, the means to retract the coupling rods, the means to release the retracting means, and the means to automatically actuate the releasing means at a pre-selected position of the body relative to the running gear constitute improvements over those means described in the previous application.

Other objects of the invention will become more apparent as the description proceeds in conjunction with the accompanying drawings, wherein:

Figure 2 is a sectional view taken on the line 2—2 of Figure 1;

Figure 3 is a sectional view taken on the line 3—3 of Fig. 2;

Figure 4 is a sectional view taken on the line 4—4 of Fig. 3;

Figure 5 is a detail of the central portion of Figure 4 broken away for purposes of clarity;

Figure 6 is a sectional view taken on the line 6—6 of Figure 3;

Figure 7 is a sectional view taken on the line 7—7 of Figure 3;

Figure 10 is a sectional view taken on the line 10—10 of Figure 2;

Figure 11 is a sectional view taken on the line 11—11 of Figure 2;

Figure 12 is a view similar to Figure 2 and illustrating a modified form of the invention;

Figure 13 is a sectional view taken on the line 13—13 of Figure 12; and

Figure 14 is a sectional view taken on the line 14—14 of Figure 13.

Specific reference is now made to the drawings wherein similar reference characters are used for corresponding elements throughout.

Figure 1:
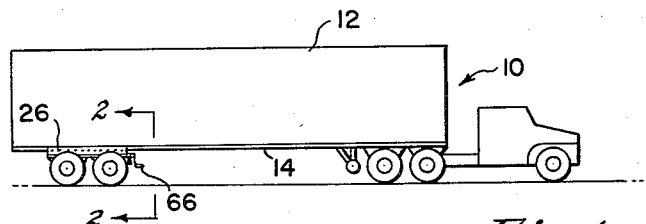
Figure 1 is a diagrammatic side elevation of a tractor-trailer embodying the pre-selector.

The invention may be applied to any motor vehicle in which the body is slidably mounted on the running gear but more specifically to a tractor-trailer 10 having a trailer body 12 for receiving a cargo load and running gear 14. The running gear comprises, among other things, a pair of spaced parallel side rails 16 and 18 which are interconnected by transverse members, one of which 20 is located adjacent the rear of the running gear. The trailer body includes, besides the side and end walls and the bottom wall 21, any suitable means for slidably mounting the body on the rails 16 and 18, such for example as the longitudinal tracks 22 and 24. The tracks include skirts disposed along the sides of the running gear rails 16 and 18, which skirts include a plurality of transversely aligned apertures 26 longitudinally spaced apart a predetermined distance such as six or twelve inches. At a predetermined location adjacent their rear ends, the running gear rails are provided with transversely extending tubes 28 having bores 30 therein opening through the rails. The trailer body may be moved relative to the running gear so that a selected one of a pair of track apertures 26 will be in transverse alignment with the bores 30.

The transverse member 20 joining the running gear rails 16 and 18 consists preferably of vertical plates 32 and 34 interconnected by a top plate 36. The means for effecting a coupling and uncoupling of the body and the running gear comprises a pair of rods 38 and 40 which are slidably mounted in the rail tubes 28 and in suitable collars 42 which are secured to the plate 34 of the member 20.

Adjustably mounted upon each of the rods is a collar 44 and wound about each coupling rod and interposed between the collars 42 and 44 is a coil spring 46. The springs 46 are tensioned to urge the coupling rods outwardly and into coupling engagement with a pre-selected pair of apertures 26 in the tracks of the trailer body.

The coupling rods are designed to operate in unison and accordingly, their inner ends are bifurcated and pivoted thereat as at 48 and 50 to a pair of links 52 and 54 which are in turn pivoted at their inner ends as at 56 and 58 between a pair of spaced plates 60 and 62.

The plates 60 and 62 are rotatable about a horizontal axis and this is accomplished by rotatably mounting the shaft 64 of a handle 66 in suitable bearings such as 68 in the opposite plates 32 and 34 of the transverse member 20 joining the running gear rails 16 and 18. The handle shaft 64 is reduced at its inner end and there pivoted, welded or otherwise fixedly secured to the plates 60 and 62 as shown clearly at 70.

A spring 72 is wound about the handle shaft 64, the ends of which being anchored in the bearings 68 and in the handle 66 as shown clearly in the broken away portions of Figure 3. The spring 72 is tensioned to normally retain the handle 66 upwardly against rotation in a clock-wise direction. Thus the tension of the spring 72 augments the tension of the springs 46 to urge the coupling rods outwardly and into coupling engagement with the trailer body apertures.

Rotation of the handle 66 in a clock-wise direction against action of the springs 46 and 72 will retract the coupling rods 38 and 40 from the apertures 26 in the tracks of the trailer body, thus permitting the body to be moved relative to the running gear.

Figure 9:
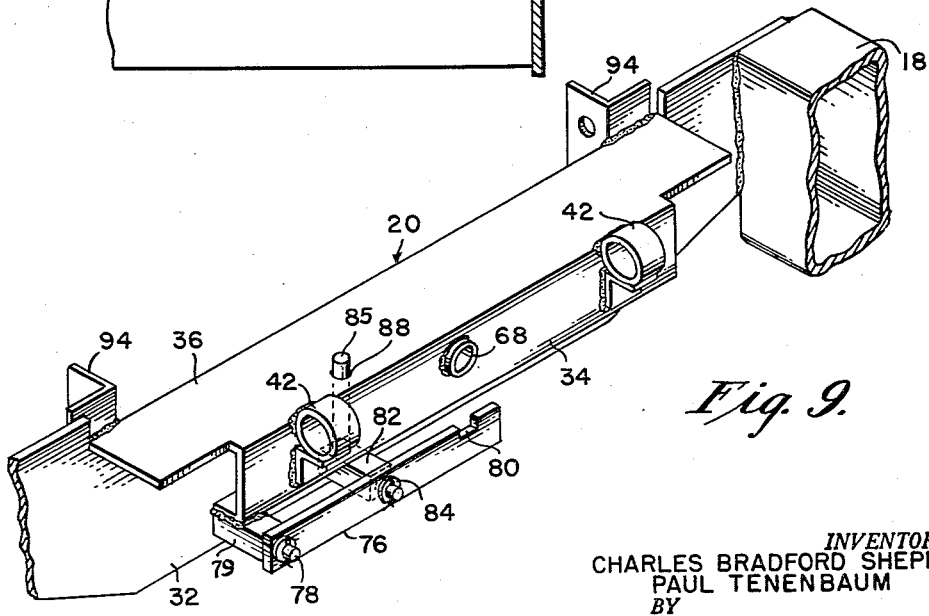
Figure 9 is a perspective view of the rear portion of the running gear looking towards the rear of the vehicle, parts being excluded for purposes of clarity.

A means is provided for selectively holding the coupling rods in a retracted or in a body coupling position and this means includes a keeper 74 in the form of a triangular member secured to and extending between the plates 60 and 62 at a predetermined location. A transversely extending latch bar 76 is provided which is pivoted at its outer end as at 78 to a block No. 79 which is attached to the plate 32 of the transverse member 20 forming a portion of the running gear (Fig. 9). The free end of the latch bar 76 includes an upwardly opening notch 80. The inner end of the latch bar 76 extends between the plates 60 and 62. When the handle 66 is in a position corresponding to the engagement of the rods 38 and 40 in the apertures of the trailer body tracks, or in the coupled position, the notch 80 of the latch bar 76 engages one corner of the triangular keeper 74 as shown clearly in Figure 5 and in phantom in the right hand position of Figure 4. When the handle 66 is rotated in a clock-wise direction to retract the coupling rods, the plates 60 and 62 rotate in unison and the triangular keeper 74 changes its position as shown in phantom at the left hand position of Figure 4 wherein one leg of the keeper 74 bears against the edge of the inner end of the latch bar 76 thus holding the plates 60 and 62 against rotation in a counter clock-wise direction.

Figure 8:
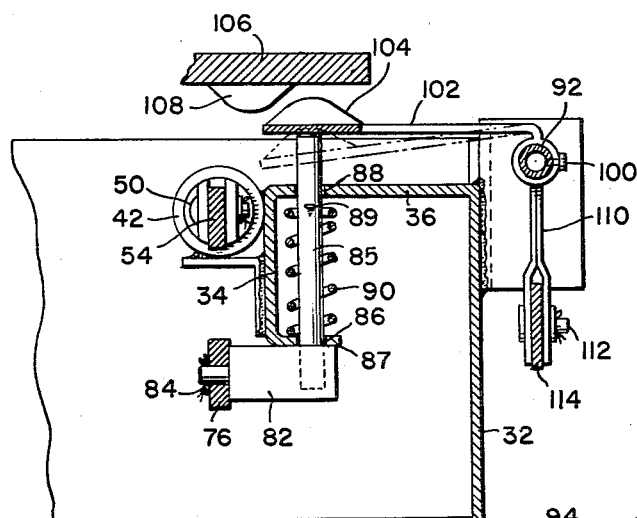
Figure 8 is a sectional view taken on the line 8—8 of Figure 2.

The latch bar 76 is urged upwardly and into engagement with the keeper 74 by means of a block 82 which is secured as at 84 to the latch bar intermediate its ends. The block 82 extends beneath the plate 34 of the transverse member 20 of the running gear and secured to said bar and carried thereby is an upstanding or vertical rod 85 which extends slidably through suitable apertures 86 and 88 in the flange 87 of the plate 34 and in the upper member 36 of the transverse running gear member 20. Wound about the rod 85 and bearing between the flange 87 and a stop 89 on the rod 85 is a spring 90 (Figs. 8 and 14) which is tensioned to urge the vertical rod 85 upwardly through the upper member 36. This spring action also urges the inner end of the latch bar 76 upwardly.

A means is provided whereby the body load may be adjustably shifted relative to the running gear in response to a predetermined movement of the body relative to the running gear. Extending transversely of the running gear in front of the plate 32 is a rod 92 which is rotatably journaled in a pair of transversely spaced apertured brackets 94 that are carried by the plate 32 of the transverse running gear member 20. One end of the rod 92 is provided with an elongated handle 96 for the operation of the same. One of the brackets 94 is provided with a slot 98 for a purpose later to appear.

Secured as at 100 to a portion of the rod 92 is a plate 102 which overlies the upper member 36 of the transverse running gear member 20 and which is rotatable with the rod 92. At a predetermined location and upstanding therefrom is a lug 104 having opposed inclined cam surfaces.

Secured by any appropriate means to the bottom wall 21 of the trailer body is a longitudinal plate 106 which has a plurality of transversely and longitudinally spaced cam lugs 108, each of which is of approximately the same size and shape as that of the cam lug 104. The longitudinal spacing of the cam lugs 108 is correlated with the longitudinal spacing of the apertures 26 in the trailer body tracks, that is, if the apertures 26 are spaced apart six or twelve inches, the cam lugs 108 will be spaced apart accordingly. The transverse spacing of the cam lugs 108 may be arbitrarily chosen at any figure such for example as three-quarters of an inch.

A means is provided whereby the lug 104 of the plate 102 may be adjustably aligned with a selected one of the trailer body lugs 108. This means comprises a bifurcated member 110 journaled upon the rod 92 to the lower end of which is pivoted as at 112 a transversely extending index bar 114, the free end of which passes through the slot 98 in the bearing bracket 94. The index bar is provided at its lower surface with a plurality of notches 116, the spacing of which is correlated with the transverse spacing of the cam lugs 108 associated with the trailer body. Thus if the bar 114 is raised and moved towards the left of the figures, the plate 102 will be moved to the left thereby. Depending upon the notch 116 chosen for the adjustment, the lug 104 on the plate 102 will thereby be moved into a position of longitudinal alignment with the cam lug 108 which corresponds to the notch 116 chosen for the adjustment.

The modified form of the invention, as shown in Figures 12–14, differs from that previously described hereabove primarily with respect to the indexing means. As in the device described hereabove, the bottom wall 21 of the trailer body is provided with a longitudinal plate 118 having a plurality of transversely and longitudinally spaced cam lugs 120. The longitudinal spacing of the cam lugs 120 is correlated with the longitudinal spacing of the apertures 26 in the tracks of the trailer body.

Appropriately secured to the plate 32 of the transverse running gear member 20 is a pair of apertured angle brackets 122 which rotatably journal a rod 124 having a handle 126 at one of its ends. Fixedly secured to the rod 124 is a plate member 128 which carries an upstanding lug 130 at a predetermined position, the lug 130 having opposed cam surfaces and being generally of the same size and shape as the trailer body lugs 120.

A bracket 132 is provided having elongated slots 134 and means 136 extending through the slots 134 to adjustably fasten the bracket 132 to the plate member 32 as shown clearly in Figure 12. The bracket 132 has a transversely extending portion 138 which is offset away from the plate member 32, the portion 138 including apertures 140 which are spaced to conform with the transverse spacing of the trailer body cam lugs 120. Secured to and depending from the rotatable rod 124 is a lug 142 having a pin 144 adjacent its lower end, the pin being adapted for engagement in a selected one of the bracket apertures 140, as will be evident from Figure 14.

In use, the trailer body is loaded with cargo and is coupled to the running gear. When it becomes necessary to shift the trailer body so that the load is distributed on the various axles in compliance with a particular State law, the present pre-selector device comes into use. In the device of Figures 1–11, the handle 96 is moved to the left so that a portion of the plate 102 overlies the rod 85 carried by the latch bar 76. The handle 96 is then rotated so that the plate 102 bears down on the rod 85 which in turn causes the notch 80 of the latch bar 76 to disengage from the triangular keeper 74. The handle 66 is then rotated in a clock-wise direction until such time as the triangular keeper 74 re-engages the edge of the innermost end of the latch bar 76. In this position the coupling rods 38 and 40 have been disengaged from the trailer body track apertures 26.

Knowing by appropriate calculations or a chart what distance the body must be advanced or retracted relative to the running gear in order to redistribute the loads on the axles, the driver moves the indexing bar 114 to the left so that the cam lug 104 is in alignment with the appropriate lug 108 carried by the trailer body.

Then the driver moves the running gear relative to the trailer body, and the point is reached where the preselected body lug 108 strikes the lug 104 on the plate 102. As it strikes the lug 104 and overrides the same, the plate 102 is pressed downwardly against the vertical rod 85 as shown in dotted lines in Figure 8. This moves the latch bar 76 out of engagement with the keeper 74 and the combined action of the coupling rod springs 46 and the handle spring 72 causes the coupling rods to snap into coupling engagement with the pre-selected apertures 26 of the trailer body tracks.

In the form of the invention shown in Figures 12–14, the same essential operation occurs except that the indexing for the pre-selection of the proper trailer body apertures is effected by the same unit which acts to release the coupling rods. That is, after the coupling rods have been retracted and the body is movable relative to the running gear, the rod 124 is moved to the left of the figures by means of the handle 126 to the point where the pin 144 is made to engage in the appropriate aperture 140 of the bracket 132. This automatically positions the cam lug 130 on the plate 128 for appropriate alignment with the desired trailer body cam lug 120 as correlated with the trailer body apertures 26. When the trailer body is moved relative to the running gear or vice versa to the point where the selected cam lug 120 overrides the cam lug 130, the plate 128 is depressed, pushing the rod 85 down and disengaging the latch bar 76 from the keeper 74. At this point the springs 46 and 72 cause the rods to snap into firm coupling position in the apertures 26 of the trailer body.

While a preferred embodiment of the invention has been shown and described hereinabove, skilled artisans may make minor variations without departing from the spirit of the invention and the scope of the appended claims.

We claim:

1. In a motor vehicle having a body slidably mounted on running gear, a plurality of longitudinally spaced apertures provided in each side of said body, a pair of coupling rods carried by the running gear, means pivotally interconnecting one pair of ends of said coupling rods, resilient means urging said rods into a pair of said apertures, means to retract said coupling rods, means to hold said rods in the retracted position, means reactive upon said holding means to release the same and allow said resilient means to urge said rods into a pre-selected pair of said body apertures, and means correlated with the spacing of said body apertures and reactive upon said release means upon predetermined movement of said body on said running gear, said retracting means including a handle having a shaft rotatably mounted on said running gear and fixedly secured to said means pivotally interconnecting said coupling rods, said resilient means including springs wound about said coupling rods and tensioned to urge said rods towards the sides of the body and a further spring wound about said handle shaft and tensioned to urge said handle and said means pivotally interconnecting said coupling rods in a direction opposite to retraction.

2. In a motor vehicle having a body slidably mounted on a running gear, a plurality of longitudinally spaced apertures provided in each side of said body, a pair of coupling rods carried by the running gear, means pivotally interconnecting one pair of ends of said coupling rods, resilient means urging said rods into a pair of said apertures, means to retract said coupling rods, means to hold said rods in the retracted position, means reactive upon said holding means to release the same and allow said resilient means to urge said rods into a pre-selected pair of said body apertures, and means correlated with the spacing of said body apertures and reactive upon said release means upon pre-determined movement of said body on said running gear, said means to hold said coupling rods in the retracted position including a keeper carried by said means pivotally interconnecting said coupling rods, a latch bar pivoted at one of its ends to said running gear and engageable at its other end with said keeper, and resilient means urging said other end of said latch bar into engagement with said keeper, said means to release said holding means including a vertical rod carried by said latch bar and slidable through a portion of said running gear, a transverse rod slidably and pivotally mounted on said running gear and having a handle on one of its ends and a plate fixedly secured to its other end, said plate being adapted to have a portion thereof overly said vertical rod upon sliding movement of said transverse rod and being adapted to depress said vertical rod and associated latch bar upon rotation of said handle in a given direction, said means correlated with the spacing of said body apertures and reactive upon said release means including transversely and longitudinally spaced cam lugs carried by said body, the longitudinal spacing thereof being correlated to the longitudinal spacing of said body apertures, a further cam lug carried by said plate, a bracket secured to said running gear and having apertures transversely spaced to conform to the transverse spacing of said body cam lugs and a pin carried by said transverse rod and engageable in a pre-selected bracket aperture upon sliding and rotating movement of said transverse rod, whereupon said further cam lug is longitudinally aligned with a pre-selected body cam lug.

3. In a motor vehicle having a body slidably mounted on running gear, a plurality of longitudinally spaced apertures provided in each side of said body, a pair of coupling rods carried by the running gear, means pivotally interconnecting one pair of ends of said coupling rods, resilient means urging said rods into a pair of said apertures, means to retract said coupling rods, means to hold said rods in the retracted position, means reactive upon said holding means to release the same and allow said resilient means to urge said rods into a pre-selected pair of said body apertures, and means correlated with the spacing of said body apertures and reactive upon said release means upon predetermined movement of said body on said running gear, said means correlated with the spacing of said body apertures and reactive upon said release means comprising transversely and longitudinally spaced cam lugs carried by said body, the longitudinal spacing thereof being correlated to the longitudinal spacing of said body apertures, a transverse rod rotatably and slidably mounted on said running gear having a handle on one end and a plate on its other end, said plate being movable by rotation of said handle to a position to react upon and release said coupling rod holding means, a further cam lug on said plate, a bracket secured to said running gear and having apertures transversely spaced to conform to the transverse spacing of said body cam lugs and a pin carried by said transverse rod and engageable in a pre-selected bracket aperture upon sliding and rotating movement of said transverse rod, whereupon said further cam lug is longitudinally aligned with a preselected body cam lug.

4. In a motor vehicle having running gear including side rails and a body having longitudinal side tracks slidably engaging the rails, a pre-selector for positioning the body load relative to the running gear comprising a plurality of longitudinally spaced apertures provided in said tracks, a pair of coupling rods mounted on said running gear for sliding movement through said rails, a bar pivotally interconnecting the inner ends of said coupling rods, springs wound about said rods and urging their outer ends towards said body side tracks, a shaft rotatably mounted on said running gear, one end of which is fixedly secured to said bar and the other end of which carries a handle, a spring wound about said shaft urging the handle in a particular direction and the coupling rods towards said body side rails, a keeper carried by said bar, a latch bar pivoted at one of its ends to said running gear and having a notch on its other end, resilient means urging the notched end of said latch bar into engagement with the keeper, a vertical rod carried by said latch bar, longitudinally and transversely spaced cam lugs carried by said body, the longitudinal spacing thereof corresponding to the longitudinal spacing of said side track apertures, a transverse rod rotatably and slidably mounted on said running gear having a handle on one of its ends and a plate at its other, a further cam lug on said plate, said plate being positionable to overlie said vertical rod and when moved downwardly to depress said vertical rod and release said latch bar, and indexing means correlated with the spacing of said body cam lugs whereby said further cam lug can be shifted to a position in longitudinal alignment with a given body cam lug.

5. The combination of claim 4 wherein said indexing means comprises a bracket, means adjustably securing said bracket on said running gear, apertures provided in said bracket spaced apart transversely in correspondence with the transverse spacing of said body cam lugs, and a pin carried by said transverse rod, said pin being selectively engageable in the bracket apertures by rotation and sliding of said transverse rod by means of its handle.

References Cited in the file of this patent

UNITED STATES PATENTS 2,332,326     Lex                    Oct. 19, 1943